No. 865,221. PATENTED SEPT. 3, 1907.
F. D. WINKLEY.
LUBRICATOR.
APPLICATION FILED JULY 18, 1906.

5 SHEETS—SHEET 1.

Witnesses
Stuart Hilder
N. Curtis Hammond

Inventor
Frank D. Winkley
By H. H. Bliss
His Attorney

No. 865,221. PATENTED SEPT. 3, 1907.
F. D. WINKLEY.
LUBRICATOR.
APPLICATION FILED JULY 18, 1906.

5 SHEETS—SHEET 2.

Witnesses
Stuart Hilder.
N. Curtis Hammond.

Inventor
Frank D. Winkley
By H. H. Bliss
His Attorney

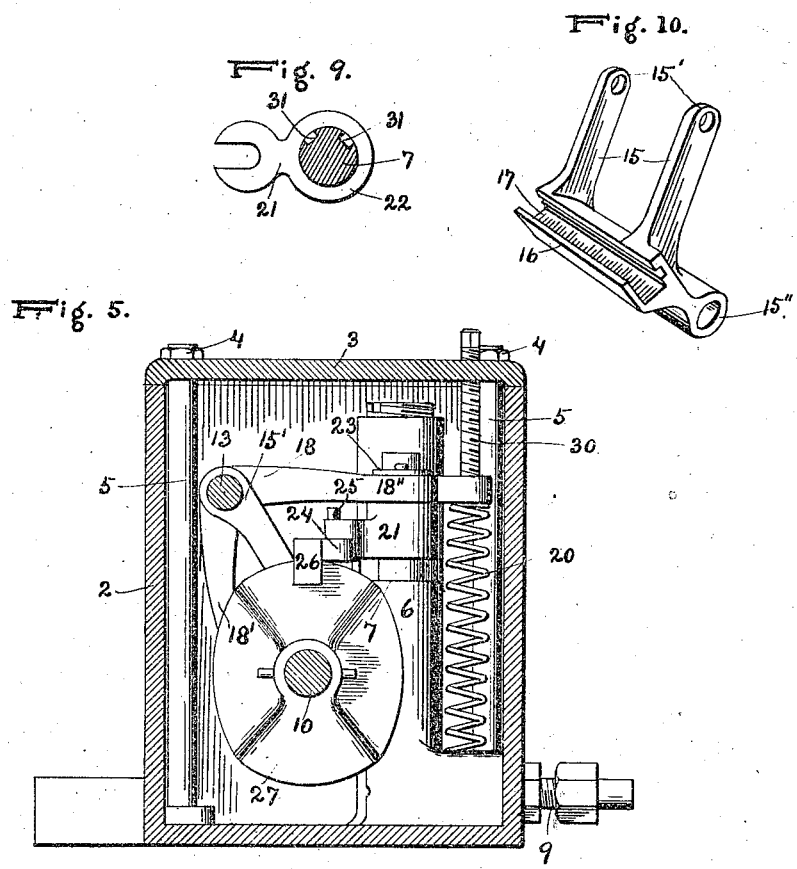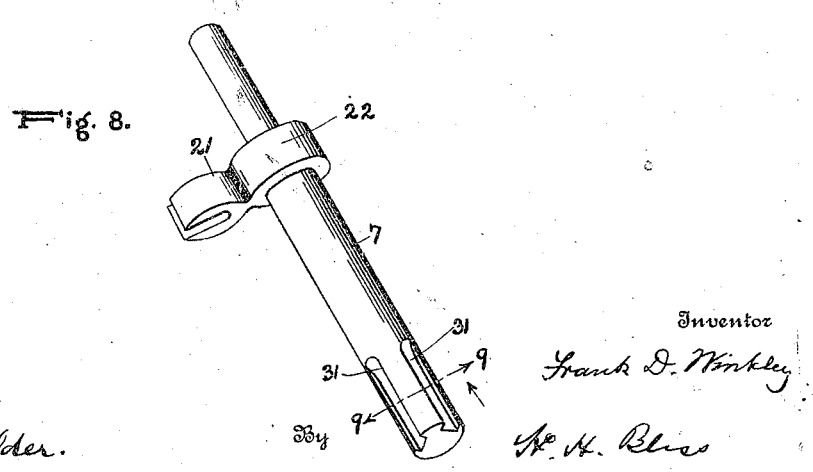

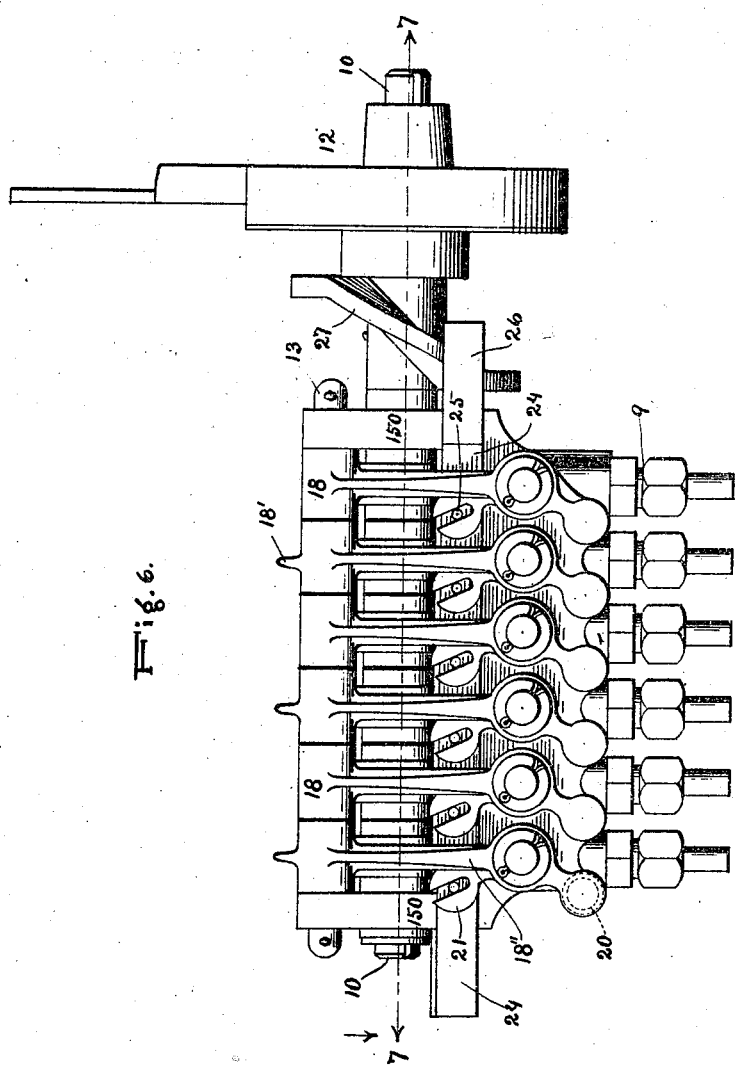

No. 865,221. PATENTED SEPT. 3, 1907.
F. D. WINKLEY.
LUBRICATOR.
APPLICATION FILED JULY 18, 1906.
6 SHEETS—SHEET 6.
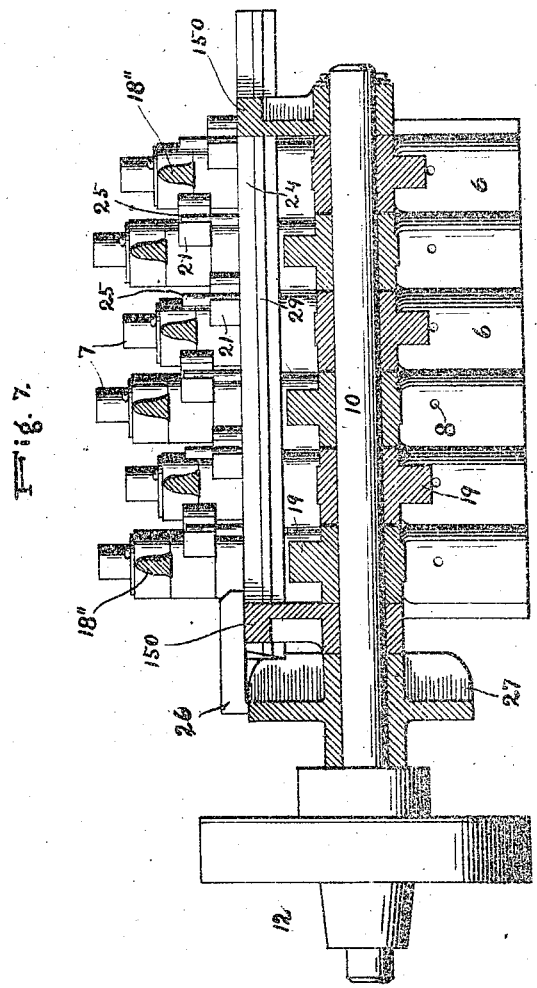
Witnesses
Stuart Hilder
N. Curtis Lammers
Inventor
Frank D. Winkley
By H. H. Bliss
his Attorney

UNITED STATES PATENT OFFICE.

FRANK D. WINKLEY, OF MADISON, WISCONSIN, ASSIGNOR TO MADISON-KIPP LUBRICATOR COMPANY, OF MADISON, WISCONSIN, A CORPORATION OF WISCONSIN.

LUBRICATOR.

No. 865,221.      Specification of Letters Patent.      Patented Sept. 3, 1907.

Application filed July 18, 1906. Serial No. 326,682.

*To all whom it may concern:*

Be it known that I, FRANK D. WINKLEY, a citizen of the United States, residing at Madison, in the county of Dane and State of Wisconsin, have invented certain new and useful Improvements in Lubricators, of which the following is a specification, reference being had therein to the accompanying drawing.

This invention relates to a force-feed lubricator and has for its object to simplify the construction thereof, and to produce a mechanism the parts of which are few in number and easily machined and assembled. These and other objects of the invention, and the advantages thereof, will be hereinafter fully set forth.

Figures 1, 2:
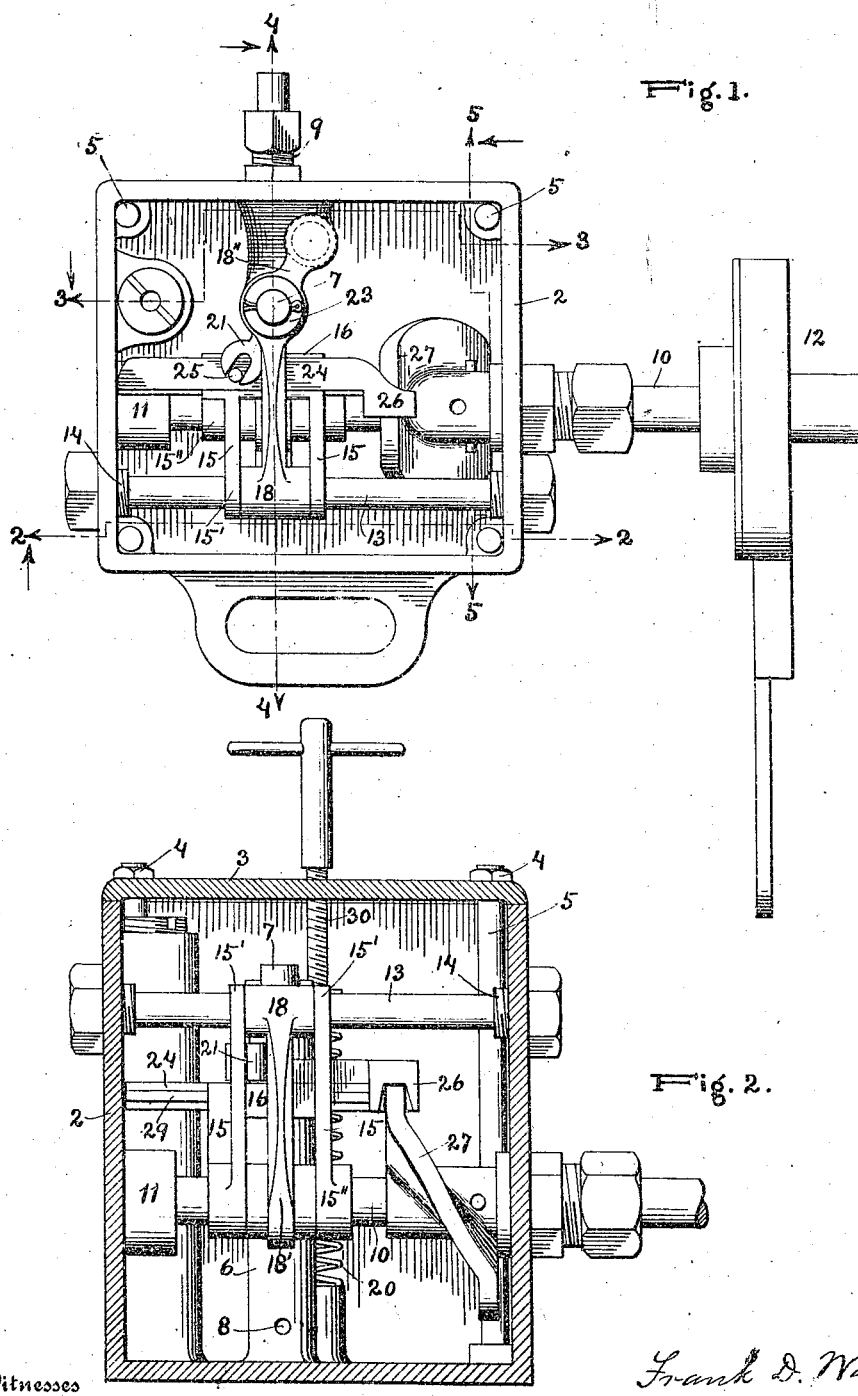
Figure 3:
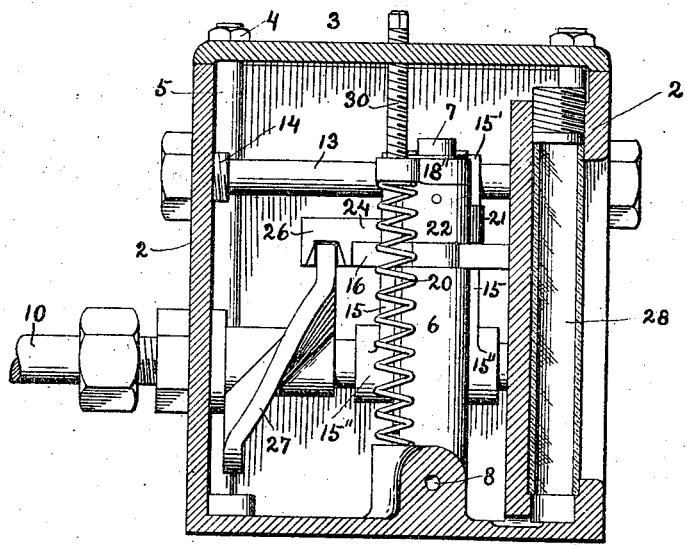
Figure 4:
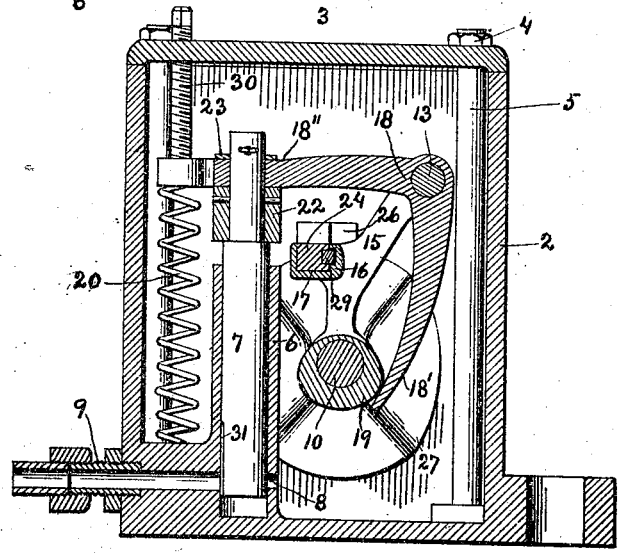

In the accompanying drawings, Figure 1 is a top plan view of a lubricating device containing my invention, and embodying a single cylinder and piston or plunger, the top or cover of the casing being removed. Fig. 2 is a side view of the lubricating mechanism, the casing being in section on the line 2—2 of Fig. 1. Fig. 3 is a view of the other side of the mechanism, the casing being in section on the line 3—3 of Fig. 1. Fig. 4 is a cross sectional view on the line 4—4 of Fig. 1. Fig. 5 is a cross sectional view on the line 5—5 of Fig. 1. Fig. 6 is a top plan view of a lubricator embodying my invention, having a plurality of pumping or force-feed mechanisms. Fig. 7 is a longitudinal vertical section taken on the line 7—7 of Fig. 6. Fig. 8 is a perspective view of the plunger of the pump and the forked crank arm secured thereto. Fig. 9 is a sectional view of the plunger taken on the line 9—9 of Fig. 8. Fig. 10 is a perspective view of the frame that is interposed between and connects the two shafts 10 and 13.

The mechanism embodying my invention may be mounted within a casing, tank or oil receptacle 2, and is so represented in Figs. 1 to 5. This may be of any suitable shape or size and provided with means for securing it in any desired position. The cover 3 is removable and adapted to be held in place by nuts 4 engaging with the screw threaded ends of the bolts or rods 5.

Formed integral with or suitably connected to the tank or receptacle 2, is a cylinder 6 in which is arranged and works a reciprocating piston or plunger 7, these two parts constituting the pump of the apparatus. There is a suitable duct 8 leading from the tank or reservoir into the cylinder, this constituting the intake passage of the pump. The delivery connection 9 leads from the pump cylinder and extends out through the wall of the casing, it being provided with suitable means for preventing leakage, in a well known manner.

10 designates the main drive shaft of the apparatus. It is mounted at one end in a bearing 11, carried by or secured to the inner face of the walls of the oil receptacle, and passes out through the opposite wall, there being at this end a stuffing box or other device for preventing the escape of the lubricant at this point. The shaft is provided at its free outer end with suitable mechanism for operating it, a clutch mechanism indicated as a whole by 12, being represented as mounted upon the shaft, and this in turn being arranged to be reciprocated and thus give to the shaft a step by step rotary motion always in one and the same direction.

13 indicates another shaft, parallel with the shaft 10 and preferably arranged at a higher level. It is suitably supported in thimble-like bearings 14 set into the opposite walls of the oil receptacle. The two shafts are connected with each other by a frame consisting essentially of two side pieces 15, 15, arranged parallel with each other but some distance apart, and connected by a cross piece 16. The upper portions of the side pieces 15, are formed into arms 15′, perforated near their ends to receive the shaft 13, while the lower parts or members, indicated by 15″, are perforated and mounted upon the shaft 10. The cross connecting piece or portion of the frame is formed into a slideway 17.

The plunger or piston 7 is free to be reciprocated longitudinally, and also to be oscillated or reciprocated axially. The advantages incident to a pump for a lubricator the piston of which is both reciprocated longitudinally and oscillated axially, are now well understood and recognized, and are fully pointed out in Reissue Patent No. 12373, to O. G. Kipp, dated July 18, 1905, and therefore need not be herein set forth at length.

I will now describe the mechanism invented by me for imparting these motions to the plunger. 18 is a bell crank lever mounted upon the shaft 13. Its lower arm 18′ is operated upon by a cam 19 mounted upon the shaft 10 and preferably arranged between two arms 15″ of the supporting frame already described. The hub or bearing of the bell crank lever is arranged between and held in place by the upper portions 15′ of the side pieces of the frame. The upper arm 18″ of the bell crank lever is connected with an extension of the plunger or piston 7, the connection between these parts being such as to permit the free oscillation of the piston. A spring 20 bears against the arm 18″ of the bell crank lever and tends normally to lift and hold it in engagement with the cam 19.

Secured to the extension of the piston rod is a crank or arm 21, forked at its outer end, the hub 22 of which lies preferably directly below the arm 18″ of the bell crank lever. A suitable abutment, such as a washer 23 held in place by a key or pin, is arranged upon the upper extension of the plunger 7.

24 is a slide situated in the way or guide 17 of the frame. It is provided with a pin 25 with which the forked end of the arm 21 engages and from which the latter receives its motion. The slide is provided at one end with a contact piece 26 adapted to engage with the rim of a cam 27 secured to the main drive shaft 10. The cam 27 is so shaped as to give a complete reciprocation to the slide—that is a movement forward and then back—with each rotation of the shaft, and to cause a dwell or rest between each movement. The cams 19 and 27 are so timed that the piston is reciprocated in one direction when the slide is at one dwell, and in the opposite direction when at the other dwell.

28 is a gage glass mounted in a recess formed in one of the walls of the casing or lubricant receptacle, this part being of any usual or preferred construction and adapted to show the amount of lubricant the receptacle may contain at any time.

From the foregoing it will be seen that the parts of my apparatus are exceedingly simple in construction, are few in number, and that they may be easily assembled, and when once put in place are not liable to become loose or disarranged.

The main shaft is preferably grooved and the cams 19 and 27 are united thereto by keys or splines. They may be further secured by cross pins if this be found desirable. The slide 24 is held in its seat by a rib 29 formed along one side or edge and engaging a correspondingly shaped groove in the cross-piece of the frame.

The lower end of the piston or plunger 7 has a pair of grooves 31 in its exterior face, properly located (peripherally) as indicated in Figs. 8 and 9. These grooves extend quite to the lower end of the plunger, but terminate at points well below the upper end of the cylinder 6. They are so disposed that when the piston is rising, under the action of the spring 20, one of them is in communication with, that is, stands opposite to, the inlet port 8, while the other groove is out of register with the outlet duct or port 9. Since the grooves extend to the lower end of the piston, it follows that when the parts are in the position just indicated, and the piston rises, the lubricant will freely pass from the receptacle or reservoir, through the port 8, into the pump cylinder below the piston. The oscillation of the piston prior to its reciprocation in the opposite direction carries the first mentioned groove out of register with the inlet port 8, and at the same time brings the other groove into register with the port or outlet duct 9; so that when the piston descends, under the action of the cam 19, the lubricant is forced from below the piston through the groove 31 and into the outlet duct. This arrangement of grooves or ducts in the piston is simple and advantageous in operation.

The operation of the mechanism may now be set forth. Starting with the slide moved to its extreme position toward the right and the straight or dwell portion of the cam 27 just beginning to operate, the first movement will be caused by the spring 20, which lifts the plunger and causes the cylinder of the pump to fill with lubricant. The cam 27 now operates to oscillate the plunger as the slide 24 is moved toward the left, the piston meanwhile remaining in its uppermost position. While the slide is held stationary to the left, by the inner straight portion of the cam 27, the plunger is forced downward causing lubricant to be discharged from the cylinder and fed to the desired part of the apparatus to be lubricated. The cycle of movements is completed as the slide moves again to the right, this taking place while the piston is held in its lowermost position.

It will be understood that the amount of lubricant delivered by the pump at each reciprocation of its piston depends upon the length of the reciprocation and the diameter of the bore in the cylinder. I provide means for varying the length of the piston stroke and thus varying the amount delivered by the lubricator. This I accomplish by means of an adjusting screw 30 seated in the top 3 of the receptacle and arranged to have its inner end come opposite to the upper arm of the bell crank lever which reciprocates the piston. By setting the adjusting screw into the path of the lever the latter is prevented from moving upward the full distance allowed by the cam 19 so that the amount of lubricant taken into the cylinder will be diminished in proportion to the extent to which the movement of the bell crank lever is limited.

I have thus far confined my description to a mechanism having but a single pump. My invention, however, is adapted to be applied to a lubricator employing a plurality of pumps or force-feed devices each arranged to deliver respectively to a different part of the machine being lubricated, and such an embodiment of my invention is represented in Figs. 6 and 7. Referring to these views it will be observed that there are several, six in the construction shown, cylinders arranged side by side. They may be and probably are formed of a unitary piece of metal. The frame in which are mounted the shafts 10 and 13 is, in this instance, integral with the body of metal of which are formed the pump cylinders, the arms for supporting the shaft 13 being designated 150. There are of course as many plungers, rocking bell crank levers 18, and cams 19, as there are pump cylinders. Likewise each piston carries a forked arm 21. It is not necessary, however, to duplicate the slide 24, or the cam that operates it, as it is quite practical to oscillate all of the plungers simultaneously and from a single part of the mechanism. I prefer when a plurality of pumps are arranged as shown in Figs. 6 and 7, to so dispose the cams 19 upon the shaft 10 that one-half of the pistons are elevated while the other one-half are being depressed, and vice versa. The advantages incident to the simple construction and arrangement of the several parts of my invention are emphasized by a consideration of Figs. 6 and 7, and it is here illustrated how easily the number of pumps may be varied. Any one of the pumps there shown can be cut out of operation by removing the bell crank lever thereof, a spacing hub being substituted therefor upon the shaft 13. Or the pump can be further disconnected by disengaging and removing the arm 21.

I have not represented the apparatus shown in Figs. 6 and 7 as being mounted in a lubricant receptacle, though it is evident that it can be so placed, if desired. On the other hand, each of the pumps can be connected by suitable ducts or conduits with a source of oil supply and each connected with the part to be lubricated whether that be near or remote.

What I claim is—

1. In a lubricator, the combination of a cylinder, a piston working therein free to reciprocate longitudinally and to oscillate about its axis, a drive shaft, two cams on the drive shaft, one arranged to give motion toward and from the axis of the shaft and the other motion in lines parallel with the shaft, and connections between the said cams and the piston arranged respectively to reciprocate and to turn axially the piston, substantially as set forth.

2. In a lubricator, the combination of a cylinder, a piston working therein, the latter being free to reciprocate longitudinally and to oscillate about its axis, a drive shaft, means between the drive shaft and plunger for reciprocating it, and other means between the drive shaft and plunger for oscillating it, the said means for operating the piston being arranged to operate alternately, that is to say, the piston being reciprocated while at rest as to oscillatory movements, and vice-versa, substantially as set forth.

3. In a lubricator, the combination with a cylinder and a piston free to reciprocate longitudinally and to oscillate therein, of means for reciprocating the piston, a reciprocating slide, and means between the slide and piston for oscillating the latter, substantially as set forth.

4. In a lubricator, the combination of a cylinder, a piston, a lever for reciprocating the piston, means for operating the lever, an arm secured to and projecting out from the piston, and means for oscillating the arm, substantially as set forth.

5. In a lubricator, the combination of a cylinder, a piston therein free to reciprocate longitudinally and to oscillate about its axis, means for reciprocating the piston, means for oscillating the piston, said parts being arranged to hold one of said sets of piston-operating means stationary while the other is in operation, substantially as set forth.

6. In a lubricator, the combination of a cylinder, a piston working therein, a main drive shaft, a pair of cams on the said shaft, connections between one of the cams and the piston through which the latter is reciprocated, and connections between the other cam and the piston through which the latter is oscillated, substantially as set forth.

7. In a lubricator, the combination of a cylinder, a piston working therein, a main drive shaft, a pair of cams mounted thereon, one being arranged to impart movement in a direction transverse to the axis of the shaft, and the other to impart movement in a direction parallel with such axis, and means between one of the cams and the piston for reciprocating it, and connections between the other of said cams and the piston for oscillating it, substantially as set forth.

8. In a lubricator, the combination of a cylinder, a piston working therein, a main drive shaft, a lever connected with the piston, a slide, connections between the slide and the piston for oscillating the latter, and a cam on the shaft for reciprocating the slide, substantially as set forth.

9. In a lubricator, the combination of a cylinder, a piston working therein, means for reciprocating the piston, a main shaft, a slide parallel therewith, a cam on the shaft for operating the slide, and connections between the slide and the piston for oscillating the latter, substantially as set forth.

10. In a lubricator, the combination of a cylinder, a piston working therein, a main shaft, a cam mounted thereon, a bell crank connected with the piston and operated by the said cam, a slide parallel with the main shaft, a cam on the shaft for reciprocating the said slide, and connections between the slide and piston by which the latter is oscillated as the slide is reciprocated, substantially as set forth.

11. In a lubricator, the combination of a cylinder, a piston working therein, a main shaft, a cam mounted thereon, a lever bearing upon the cam and connected with the piston and arranged to reciprocate the latter, a spring for moving the lever and holding it in engagement with the cam, a slide, connections between the slide and the piston by which the latter is oscillated as the slide is moved, and means for operating the slide, substantially as set forth.

12. In a lubricator, the combination of a series of cylinders, pistons working therein, the pistons being each free to be reciprocated longitudinally and oscillated about its axis, independent means for reciprocating each piston, and a common means for oscillating the pistons, substantially as set forth.

13. In a lubricator, the combination of a series of cylinders, pistons working therein, each piston being free to be reciprocated longitudinally and oscillated about its axis, independent means for reciprocating each piston, and means common to the several pistons for oscillating them, the said means for operating the pistons being arranged to operate alternately, that is to say, the pistons being reciprocated while at rest as to axial movement, and vice versa, substantially as set forth.

14. In a lubricator, the combination of a series of cylinders, pistons working therein, a main shaft upon which are a series of cams, levers operated by the said cams and connected with the pistons for reciprocating them, a single slide, a cam on the main shaft for reciprocating the slide, and connections between the several pistons and the slide for oscillating the former, substantially as set forth.

15. In a lubricator, the combination of a series of cylinders, pistons working therein, a main shaft upon which are a series of cams corresponding in number with the pistons, levers operated by the cams and connected with the pistons for reciprocating them, the said cams being so arranged that part of the pistons are moved in one direction while the rest are being moved in the opposite direction, a single slide, means for reciprocating the slide, and connections between the said pistons and the slide for oscillating the former, substantially as set forth.

16. In a lubricator, a pump-like device comprising a cylinder with an oil inlet port and an oil outlet port, a plunger or piston adapted to work within the cylinder and provided near its inner end with a pair of grooves 31–31 extending quite to the end of the plunger, but terminating below the upper end of the cylinder, and means for reciprocating and oscillating the plunger in the cylinder chamber, the grooves being arranged as set forth, whereby one of them registers with the inlet port when the plunger moves outward, and the other registers with the outlet port when the plunger moves inward, substantially as set forth.

In testimony whereof I affix my signature, in presence of two witnesses.

FRANK D. WINKLEY.

Witnesses:
CHAS. E. _____,
S. D. ROSS.